United States Patent Office 2,729,588
Patented Jan. 3, 1956

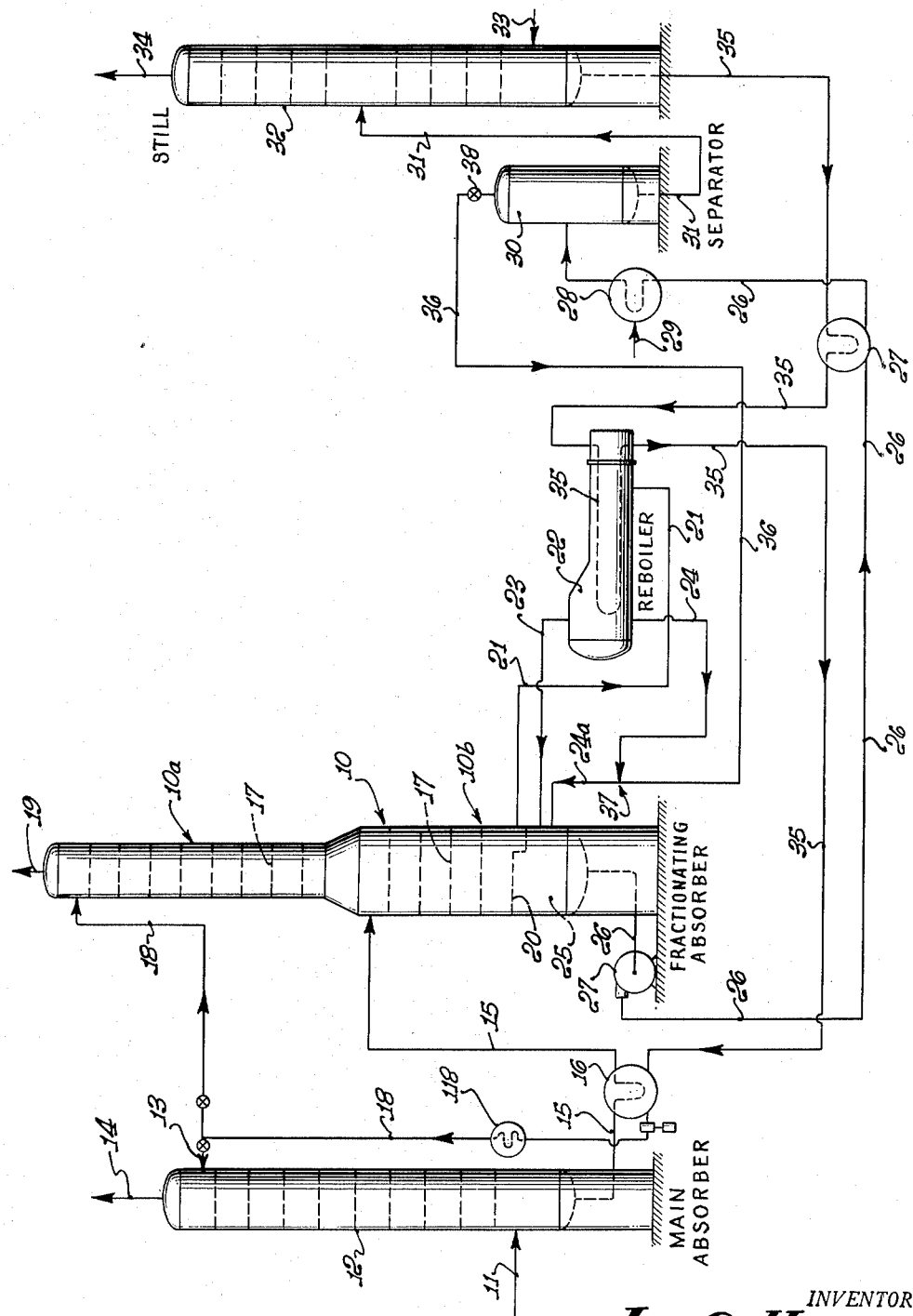

2,729,588

OPERATING A REBOILER SYSTEM FOR FRACTIONATING ABSORBER-STILLS WHICH COMPRISES SEPARATELY INTRODUCING VAPORS AND LIQUID FROM THE REBOILER INTO THE STILL AND MIXING ABSORBED VAPORS VAPORIZED FROM THE STILL BOTTOMS WITH THE LIQUID BEFORE ITS INTRODUCTION INTO THE STILL

Joe C. Hannah, Anaheim, Calif., assignor to The Fluor Corporation, Ltd., Los Angeles, Calif., a corporation of California Application February 23, 1952, Serial No. 273,019

7 Claims. (Cl. 196—8)

This invention has to do with hydrocarbon gas refining systems involving the use of a fractionating type absorber for the separation of one or more lower boiling components of a hydrocarbon mixture from a higher boiling residue of the mixture. Typically the fractionating absorber may be operated to separate the methane and ethane components of a previously absorbed mixture containing also $C_3$, $C_4$ and heavier hydrocarbons.

Systems of this type employ the fractionating absorber together with a heating zone or still into which absorption oil enriched by the $C_3$ and heavier hydrocarbons is taken from the fractionating absorber for stripping, the residual (lean) hot absorption oil being recirculated from the still back to the fractionating absorber. A major factor in the operating expense of the plant is of course the cost of heating the oil for purposes both of desorption and fractionation as well as final stripping in the still. Customarily, the heating requirements are economized by heat interchange between the hot lean oil and the antecedent enriched absorption oil at stages that may range from within the fractionating absorber to locations between the latter and the still.

The invention has for its primary object the provision of an improved heat interchange system resulting not only in high heat economies, but also in an efficient method of contacting and admixing vapors released by the hot lean oil heat transfer to the rich oil leaving the fractionating absorber, with the partially denuded oil stream being recirculated from a reboiler back into the fractionating absorber column. In accordance with the invention, heat is supplied to the column reboiler by transfer from the hot lean oil being returned from the still, the column bottom rich oil is withdrawn and heated and the absorbed hydrocarbons partially vaporized, and the resulting vapors are intimately admixed and returned to the column concurrently with the reboiler oil stream being recirculated back to the column. In this manner all the heat requirements of the fractionating absorber column operation, aside from such heat as may be required in the feed, may be satisfied by the recirculated mixed oil and vapor stream.

The invention preferably contemplates heating and partially vaporizing the rich absorption oil ahead of the still, as within a first and independently heated zone, the vapors from which are admixed with the returned reboiler oil stream while the residual absorption oil goes into the still for final stripping.

As will appear, ultimate heat economies are further favored by heat interchange between the hot lean oil and the rich oil stream going to the first heating zone, and between the lean oil and the column feed stream.

All the features and objects of the invention, as well as the details of an illustrative embodiment, will be understood more fully from the following description of the accompanying flow sheet.

As illustrated in the drawing, the hydrocarbon mixture to be fractionated in the fractionating absorber generally indicated at 10, may be derived from a natural or refinery gas mixture containing $C_1$ through $C_4$ hydrocarbons fed through line 11 to a main absorber 12 into the top of which lean oil is fed through line 13, and from which non-hydrocarbon gases and some or the bulk of the methane are discharged through line 14. The rich oil flows from the base of the absorber 11 through line 15 and exchanger 16 into an intermediate location within the fractionating absorber 10.

The column 10 contains a vertical series of liquid and gas contact trays 17 within both the upper absorption section 10a of the column and the lower stripping section 10b. The preheated rich absorption oil entering the column through line 15, partially vaporizes and the vapors in flowing upwardly through the absorption section 10a are intimately contacted with lean oil introduced to the top of the column through line 18. Assuming the fractionating absorber 10 to be operated as a deethanizer, the gas leaving the top of the column through line 19 may contain all the methane and substantially all of the ethane contained in the rich absorption oil feed to the column. The absorption oil flowing down through section 10a of the column passes together with the absorption oil and unvaporized hydrocarbons introduced through line 15, downwardly through the stripping section 10b, from the bottom draw-off tray 20 in which the oil stream is taken through line 21 into a reboiler 22. As will appear, the oil in the reboiler is heated by indirect exchange from lean oil being recirculated from the still, to a temperature at which some of the absorbed hydrocarbons are vaporized for return to the column 10 below the bottom tray 20 through line 23. The unvaporized oil is recirculated through line 24 into the base chamber 25 of the column from which the oil is withdrawn through line 26 and pump 27.

The absorption oil stream in line 26 passes through exchanger 27 and a suitable heater 28 fed through line 29 with steam or other heating medium serving to heat the oil stream to a temperature sufficient to partially vaporize the absorbed hydrocarbons. The resulting oil-vapor mixture enters a flash or separating chamber 30 from which the oil is withdrawn through line 31 and introduced to the usual stripping still column 32 which may be fed with stripping steam through line 33. In column 32 the absorption oil is stripped of its absorbed higher boiling hydrocarbons which leave the still, together with the stripping steam, through line 34. The hot lean oil is withdrawn from the base of the still through line 35 and is recirculated through and in indirect heat exchange relation with the rich oil in exchanger 27, the oil in the reboiler 22 and the rich oil stream flowing from the main absorber 12 through exchanger 16 to the fractionating absorber 10. From exchanger 16 the cooled lean oil flows through cooler 118 and lines 13 and 18 to the absorber.

The vapors leaving the separating chamber 30 through line 36, and which may be assumed to consist largely of $C_3$ and heavier hydrocarbons, are returned at 37 into line 24 carrying the oil stream being recirculated from the reboiler 22 back into the base of the column 10. The vapors may be injected into a vertical extent 24a of line 24 sufficiently long to assure intimate and thorough admixing of the liquid and vapor phases before the mixture enters the column, the vapor serving simultaneously to elevate and inject the liquid through the vertical extent of the mixing line 24a. From chamber 25 the vapors from line 24a, together with the reboiler vapors returned through line 23, flow upwardly through trays 20 and 17 in the section 10b as a vapor stripping medium for the down flowing absorption oil.

As illustrative of operating conditions typically for de-ethanization in the fractionating absorber, the main absorber 12 may be operated at a pressure ranging from 100 to 1000 p. s. i. g., with the fractionating absorber 10 operating at a pressure of about 50 to 950 p. s. i. g. The lean oil (from line 18) circulation rate within the absorption section 10a may be from 10 to 75% of the lean oil rate (through line 13) to the main absorber. The temperature of the rich oil feed to the column 10 may be between about 60 to 115° F., and the heat input to the column controlled to give a bottom oil temperature in line 26 of about 200 to 450° F. The reboiler temperature may range from about 150 to 350° F., and the temperature to which the oil is heated at the flash chamber 30 is within the range of about 250 to 550° F. The pressure in the flash chamber may be maintained by the back pressure valve 38 within the range of about 50 to 500 p. s. i. g. Ordinarily the hot lean oil will leave the still 32 through line 35 at a temperature of about 200 to 600° F.

Since it is necessary to control the removal of undesired constituents in the fractionating absorber 10, to prevent excessive loss of the desired constituents and to give proper product purity, it is desirable to closely control the temperature and pressure in the flash vessel 30. This temperature is dependent upon the composition of the wet gas fed to the main absorber 12. Sometimes, the required temperature in chamber 30 becomes so low in plant operation, due to composition changes in the wet gas feed, that it is difficult to obtain proper stripping of the lean oil in the still 32. This situation can be economically remedied by controlling the pressure in the flash vessel 30 independently of the fractionating absorber 10 pressure. Increasing the pressure in chamber 30 results in giving to the still feed an equilibrium temperature high enough to assure proper stripping.

As will be observed, the process has the characteristic function of providing low temperature heat sinks for recovering heat from the hog stripped lean oil by concurrently contacting the vapor from the flash chamber with the liquid being recirculated from the reboiler, so that the liquid and vapor substantially reach equilibrium with each other before entering the fractionating absorber. This condition establishes one theoretical contact between the flash chamber and reboiler, thus greatly reducing the temperature level and providing a lower temperature heat sink for recovering heat from the lean oil.

I claim:

1. The process of fractionally absorbing hydrocarbons from a mixture of higher and lower boiling hydrocarbons, that includes introducing said mixture to a vertically extended absorption and fractionating zone containing a vertical series of trays above and below the mixture inlet, maintaining the mixture in said absorption and fractionating zone at a temperature above the vaporizing temperature of the lower boiling hydrocarbons under the existing pressure, introducing lean absorption oil to an upper location in said zone for downward flow counter-currently in contact with rising vapors liberated from said mixture and concurrently with unvaporized components of said mixture flowing downwardly below the inlet, removing unabsorbed vapors from the top of said zone, passing said unvaporized components and absorption oil from a lower portion of said zone through a reboiling zone, separately returning vapors of a portion of said components and an unvaporized liquid stream from the reboiler zone to the lower portion of the absorption and fractionating zone, removing the returned liquid from the bottom of the absorption and fractionating zone and heating and vaporizing said components remaining in the absorption oil, separating the vapors as a first lower boiling vapor stream and a second higher boiling vapor stream from a hot residual absorption oil containing stream, introducing said first vapor stream into said liquid stream flowing from the reboiler zone into the absorption and fractionating zone so that the liquid and vapors are intimately admixed before entering the absorption and fractionating zone, and passing said residual absorption oil stream in heated condition in indirect heat exchange relation with the liquid in the reboiler and thence to said upper location in the absorption and fractionating zone.

2. The process as defined in claim 1, in which said heated residual absorption oil stream is passed in indirect heat exchange relation with the said liquid being removed from the absorption and fractionating zone.

3. The process of fractionally absorbing hydrocarbons from a mixture of higher and lower boiling hydrocarbons, that includes introducing said mixture to a vertically extended absorption and fractionating zone containing a vertical series of trays above and below the mixture inlet, maintaining the mixture in said absorption and fractionating zone at a temperature above the vaporizing temperature of the lower boiling hydrocarbons under the existing pressure, introducing lean absorption oil to an upper location in said zone for downward flow counter-currently in contact with rising vapors liberated from said mixture and concurrently with unvaporized components of said mixture flowing downwardly below the inlet, removing unabsorbed vapors from the top of said zone, passing said unvaporized components and absorption oil from a lower portion of said zone through a reboiling zone, separately returning vapors of a portion of said components and an unvaporized liquid stream from the reboiler zone to the lower portion of the absorption and fractionating zone, removing the returned liquid from the bottom of the absorption and fractionating zone to a first heating zone and heating and partially vaporizing the liquid to produce a first vaporized portion of the hydrocarbons absorbed in the absorption oil and a heated residual oil stream, separating the resulting vapors and introducing them into said liquid stream flowing from the reboiler zone into the absorption and fractionating zone so that the liquid and vapors are intimately admixed before entering the absorption and fractionating zone, passing said heated residual oil stream through a second heating zone to vaporize from the absorption oil a remaining portion of the hydrocarbons absorbed therein and separately withdrawing vapors from said second heating zone and a hot lean absorption oil stream and passing said hot lean absorption oil stream in indirect heat exchange relation with the liquid in the reboiler zone and thence to said upper location in the absorption and fractionation zone.

4. The process as defined in claim 3, in which said hot lean absorption oil stream is passed in indirect heat exchange relation with the liquid stream flowing from the absorption and fractionating zone to said first heating zone.

5. The process of fractionally recovering hydrocarbons from a mixture of higher and lower boiling hydrocarbons, that includes passing said mixture in gaseous form into a first absorber and therein absorbing said mixture in a higher boiling absorption oil, passing the oil and absorbed mixture through a heat exchange zone into a vertically extended absorption and fractionating zone containing a vertical series of trays above and below the mixture inlet, maintaining the mixture in said absorption and fractionating zone at a temperature above the vaporizing temperature of the lower boiling hydrocarbons under the existing pressure, introducing lean absorption oil to an upper location in said zone for downward flow counter-currently in contact with rising vapors liberated from said mixture and concurrently with unvaporized components of said mixture flowing downwardly below the inlet, removing unabsorbed vapors from the top of said zone, passing said unvaporized components and absorption oil from a lower portion of said zone through a reboiling zone, separately returning vapors of a portion of said components and an unvaporized liquid stream from the reboiler zone to the lower portion of the absorption and fractionating zone, removing the returned liquid from the bottom of the absorption and fractionating zone and heating and vaporizing absorbed hydrocarbons from the absorption oil in the liquid, separating the vapors as a first lower boiling vapor stream and a second higher boiling vapor stream from a liquid hot lean absorption oil stream, introducing said first vapor stream into said liquid stream flowing from the reboiler zone into the absorption and fractionating zone so that the liquid and vapors are intimately admixed before entering the absorption and fractionating zone, and passing said hot lean absorption oil stream in indirect heat exchange relation with the liquid in the reboiler zone and thence through said heat exchange zone and thence passing separate streams of the absorption oil to said first absorber and said upper location in the fractionating absorber.

6. The process of fractionally recovering hydrocarbons from a mixture of higher and lower boiling hydrocarbons, that includes passing said mixture in gaseous form into a first absorber and therein absorbing said mixture in a higher boiling absorption oil, passing the oil and absorbed mixture through a heat exchange zone into a vertically extended absorption and fractionating zone containing a vertical series of trays above and below the mixture inlet, maintaining the mixture in said absorption and fractionating zone at a temperature above the vaporizing temperature of the lower boiling hydrocarbons under the existing pressure, introducing lean absorption oil to an upper location in said zone for downward flow counter-currently in contact with rising vapors liberated from said mixture and concurrently with unvaporized components of said mixture flowing downwardly below the inlet, removing unabsorbed vapors from the top of said zone, passing said unvaporized components and absorption oil from a lower portion of said zone through a reboiling zone, separately returning vapors of a portion of said components and an unvaporized liquid stream from the reboiler zone to the lower portion of the absorption and fractionating zone, removing the returned liquid from the bottom of the absorption and fractionating zone to a first heating zone and heating and partially vaporizing absorbed hydrocarbons from the absorption oil to produce vapors and a heated residual oil stream, separating the resulting vapors and introducing them into said liquid stream flowing from the reboiler zone into the absorption and fractionating zone so that the liquid and vapors are intimately admixed before entering the absorption and fractionating zone, passing said heated residual oil stream through a second heating zone and vaporizing additional hydrocarbons from the absorption oil, separately withdrawing vapors and a hot lean absorption oil stream and passing said hot lean absorption oil stream through said reboiler zone and thence in separate streams to said first absorber and said upper location in the fractionating absorber.

7. The process as defined in claim 6, in which said hot lean absorption oil stream is passed also in indirect heat exchange relation with the liquid stream flowing from the absorption and fractionating zone to said first heating zone.

References Cited in the file of this patent

UNITED STATES PATENTS

| 1,144,868 | Roy | June 29, 1915 |
| 1,152,458 | Waggoner | Sept. 7, 1915 |
| 1,813,024 | Clarke et al. | July 7, 1931 |
| 1,960,914 | McCoy | May 29, 1934 |
| 2,179,833 | Sondermann | Nov. 14, 1939 |
| 2,281,282 | Gerhold | Apr. 28, 1942 |
| 2,288,453 | Hill | June 30, 1942 |
| 2,302,187 | Carney | Nov. 17, 1942 |
| 2,468,750 | Gudenrath | May 3, 1949 |
| 2,638,437 | Ragatz | May 12, 1953 |

OTHER REFERENCES

Ragatz: "Petroleum Refiner," December 1951, vol. 30, No. 12, pages 143–148, page 145 specifically relied on.